United States Patent [19]
Judd et al.

[11] Patent Number: 5,255,565
[45] Date of Patent: Oct. 26, 1993

[54] METHOD AND APPARATUS FOR MONITORING MULTIPLE POINTS ON A VIBRATING STRUCTURE

[75] Inventors: John E. Judd, Hamden; Kenneth E. Appley, Orange; Yi H. Lo, Hamden, all of Conn.

[73] Assignee: Vibra-Metrics, Inc., Hamden, Conn.

[21] Appl. No.: 791,011

[22] Filed: Nov. 12, 1991

[51] Int. Cl.$^5$ .......................................... G01H 13/00
[52] U.S. Cl. ...................................... 73/579; 73/594; 73/659; 248/550; 364/507; 364/508
[58] Field of Search ................. 73/587, 594, 579, 584, 73/659; 248/550; 364/507, 508

[56] References Cited

U.S. PATENT DOCUMENTS

| | | | |
|---|---|---|---|
| 2,668,444 | 2/1954 | Berman | 73/88 |
| 3,744,300 | 7/1973 | Fleury | 73/67.3 |
| 3,875,381 | 4/1975 | Wingfield et al. | 235/151.3 |
| 3,956,926 | 5/1976 | Phillips | 73/88 |
| 4,006,625 | 2/1977 | Davis | 73/659 |
| 4,164,149 | 8/1979 | Okubo | 73/594 |
| 4,188,830 | 2/1980 | Mason et al. | 73/801 |
| 4,397,186 | 8/1983 | Phelan et al. | 73/584 |
| 4,429,578 | 2/1984 | Darrel et al. | 73/659 |
| 4,481,818 | 11/1984 | Hellqvist | 73/587 |
| 4,535,629 | 8/1985 | Prine | 73/587 |
| 4,549,437 | 10/1985 | Weins et al. | 73/587 |
| 4,550,604 | 11/1985 | Sugimoto et al. | 73/587 |
| 4,559,828 | 12/1985 | Liszka | 73/658 |
| 4,561,062 | 12/1985 | Mitchell | 364/555 |
| 4,598,592 | 7/1986 | McMaster | 73/786 |
| 4,609,994 | 9/1986 | Bassim et al. | 364/551 |
| 4,901,575 | 2/1990 | Bohannan et al. | 73/587 |
| 4,956,999 | 9/1990 | Bohannan et al. | 73/587 |
| 4,989,159 | 1/1991 | Liszka et al. | 364/508 |

FOREIGN PATENT DOCUMENTS 2137347A 10/1984 United Kingdom.

OTHER PUBLICATIONS

Structural Testing, Part 2–Modal Analysis & Simulation Bruel & Kjaer, Mar. 1988.
Monitoring Bridge Vibrations, DeWolf, Kou, Final Report Project 85-1 JHR 87-171, Apr. 1987.
Study of Vibrations in Connecticut for the Founders Bridge, Rose, Kou, DeWolf, Project 85-1, JHR 87-170, Mar. 1987.
Study of Bridge Vibrations for Connecticut, LaShomb, Kou, Gant, DeWolf, Final Report, JHR85-165, Oct. 1985.
Development of a Bridge Monitoring Technique, DeWolf, Lauzon, Mazurek, Univ. of Conn, Storrs, CT. Synopsis, Sep. 1988.
Experimental Study of a Bridge Vibration Monitoring Technique, Mazurek, DeWolf, Sep. 1989.
Mathematical Background & Application to Detection of Structural Deterioration in Bridges. Reed and Cole, FHWA-RD-76-181, Sep. 1976.

(List continued on next page.)

*Primary Examiner*—Hezron E. Williams
*Assistant Examiner*—Rose M. Finley
*Attorney, Agent, or Firm*—DeLio & Peterson

[57] ABSTRACT

An apparatus for monitoring a vibrating structure, such as a bridge, uses multiple motion sensors spaced along the structure, each of which produces an analog raw data signal which is then filtered in anti-aliasing filters to remove substantially all frequency components of the signal above a selected cutoff frequency, $f_{co}$. The filter outputs are connected to addressed inputs of an analog multiplexer which then multiplexes the signals in response to a channel address clock which repeatedly generates a sequence of channel addresses to scan the data input channels at the multiplexer corresponding to the addresses in the sequence. The complete sequence of addresses is repeated at a frequency of at least twice the cutoff frequency to obtain substantially simultaneous samples from the sensors so that data from different sensors may be correlated. The multiplexed signal is then converted to digital form and stored. The apparatus preferably also includes a fast Fourier transform processor to convert the data to the frequency domain and a means for calculating the response mode shapes for the structure from the frequency domain data.

10 Claims, 6 Drawing Sheets

OTHER PUBLICATIONS

Field Study of Vibrations in a Continuous Bridge, DeWolf, Kou, Rose, Univ. of Conn. IBC-86-16.

Development of an Automated Bridge Monitoring System, Lauzon, Mazurek, DeWolf, Final Report, JHR-9-0-192, May 1990.

Modifications of an Analytical Method for Highway Bridge Monitoring, Mazurek, Dept. Civil Engineering, US Coast Guard Academy.

What is Pattern Recognition?, Introduction, K. S. Fu.

Bridge Vibration, S. M. LaShomb, Univ. of Conn. 1985.

BRIDGE CROSS SECTION

THIRD BENDING MODE SHAPE

Mode Shapes For The First, Second
And The Third Bending Modes

METHOD AND APPARATUS FOR MONITORING MULTIPLE POINTS ON A VIBRATING STRUCTURE

BACKGROUND OF THE INVENTION

1. Field of the Invention

This invention relates to devices for monitoring bridges and similar large engineered structures which vibrate in response to environmentally induced excitations such as traffic or wind. More specifically, the invention relates to monitoring the motion and structural integrity of such structures with multiple vibration sensors by collecting data from all of the sensors substantially simultaneously in order to determine the response mode shapes of the vibrating structure.

2. Description of Related Art

The structural integrity of large steel and concrete structures, such as bridges, is a subject of continuing concern. One approach to monitoring the structural health of bridges has been to supplement visual inspection with vibration monitoring using linear or angular motion sensors. Such systems are shown in U.S. Pat. No. 4,956,999 issued to Bohannan et al., on Sep. 18, 1990 (linear sensors) and U.S. Pat. No. 4,164,149 issued to Okubo on Aug. 14, 1979 (angular sensors).

One problem with such data collection systems is that although they use multiple sensors, the data from each sensor is collected slowly or at different times. As a consequence, although the collected data may be sufficient to determine the precise motion of any individual monitored location on the structure, it is not possible to correlate the data from one monitored point with the data from another point so as to determine how one portion of the bridge is moving relative to another portion.

In most earlier vibration data collection devices, multiple sensors have been used so that at least one sensor will be located near a potential failure site. At this location, it was believed that the maximum change in vibrational characteristics would occur. However, in the present invention, data is collected at multiple sites so that a global analysis can be performed. It has been found that the shape of the vibration modes for the entire structure will change significantly due to potentially catastrophic failures in the structure which may not be picked up by prior art monitoring devices.

Prior art systems have not recognized the value in collecting the data from multiple sensor locations simultaneously. Most previous systems have used single channel data collection methods where a single accelerometer or angular sensor is monitored for a relatively long period of time, i.e., for one or more cycles of the vibration frequency of interest.

Even where multiple sensors are used and the monitoring can be switched between them, the long monitoring time for each sensor means that the position of the first sensor will have changed significantly before the second or any subsequent sensor is monitored. The problem of determining exactly how the bridge is moving and responding to an excitation is made even more difficult when the excitation is random. Such is the case with environmentally induced excitations, e.g. traffic induced bridge vibration, where the time of the excitation, the amplitude and the location of the excitation point all vary significantly. This makes it impossible to compare or corrrelate data from different points in prior art systems of data collection.

Some systems avoid this problem by using a known impulse excitation, such as a hammer blow or variable frequency vibration driver to excite the vibrations instead of monitoring environmentally induced vibrations, but this is not always practical or desirable.

Another problem with some prior art systems has been that they convert analog data from the motion sensors to digital data at too early a point, or they multiplex data to reduce cabling costs and fail to use anti-aliasing procedures. This can lead to errors in the data analysis such as phantom vibration peaks.

Consequently, one object of the present invention is to provide an apparatus that collects vibration data from multiple points on a vibrating structure, substantially simultaneously up to a maximum frequency of interest.

Another object is to provide a method of analyzing the collected data and calculating the vibration mode shapes of the monitored structure.

Still other objects and advantages of the invention will be obvious from the specification.

SUMMARY OF THE INVENTION

The present invention comprises an apparatus for monitoring multiple points on a vibrating structure, such as a bridge, employing multiple motion sensors spaced along a vibrating portion of the structure. Each sensor produces an analog output raw data signal indicative of motion of the structure at its respective point. Preferably linear accelerometers are used as the motion sensor. Each sensor is connected to a corresponding anti-aliasing filter which removes substantially all frequency components of the raw data signal above a selected cutoff frequency, $f_{co}$, which is the maximum frequency of interest.

The output of the filter is fed to an analog multiplexer having a multiplexer output, an address input, and a plurality of data input channels, each with a unique input channel address. The multiplexer multiplexes the filtered data from the motion sensors onto its output. The filtered data at a data input channel is passed to the multiplexer output whenever the address of that data input channel is applied to the address input of the analog multiplexer. By varying the address at the address input, the data from the multiplexer channel inputs is multiplexed onto its output.

A channel address clock repeatedly generates a sequence of channel addresses, and its output is connected to the address input of the analog multiplexer. As the addresses in the sequence change, the channel address clock scans the data input channels of the multiplexer which correspond to the addresses in the generated sequence.

In the preferred design, the address clock simply increments the address from the lowest channel address to the highest, then repeats, however other sequences of addresses may be used. The complete sequence of all the addresses to be scanned is repeated by the address clock at a frequency of at least twice the selected cutoff frequency, $f_{co}$. This samples data from the motion sensors rapidly enough that the response mode shapes of the monitored structure can be calculated for mode shapes having characteristic frequencies less than $f_{co}$.

An analog to digital converter is connected to the output of the analog multiplexer to produce a multiplexed digital data signal. The multiplexed digital data signal contains the desired information and is then stored in a storage means for further processing.

In the preferred embodiment, means is provided for calculating the response mode shapes of the monitored bridge which includes a fast Fourier transform (FFT) processor to calculate the frequency spectrum for the stored data from each sensor. Because the stored data from each sensor was collected substantially simultaneously from all of the sensors, the peaks in the frequency spectrums, showing the vibration of the structure for various modes, are the result of the same environmentally induced excitations. The relative amplitudes of those peaks may therefore be compared to provide meaningful information and may be used to calculate the response mode shape for the bridge.

Other types of analysis may also be performed. Due to the speed of the sampling, the position of the first sampled sensor cannot have moved significantly before the last sensor is sampled. Where accelerometers are used as the sensors, the acceleration values at each point may be integrated once to obtain the velocity of the monitored points or integrated twice to determine the actual position of the sensor as a function of time. Thus, the motion of each of the sensor points may be determined exactly, and these motions may be correlated with one another to calculate the three dimensional motion of the structure.

However, this level of detailed information on three dimensional motion, while it may be calculated from the data collected from the apparatus of this invention, has not been found to be necessary for monitoring the structural integrity of the structure. In the preferred practical embodiment of the invention, the monitoring apparatus includes a means for calculating the shape of the response modes of the structure for the principal vibration modes of interest. The shapes of the principal response modes are global indicators of the physical parameters of the structure, and changes in those shapes can signal changes in structural integrity.

Response mode shapes may also be called vibration mode shapes or deflection mode shapes.

In a simple embodiment of the invention, the output of a first analog multiplexer is connected directly to the input of the analog-to-digital converter. However, in an alternative design, the apparatus further includes at least one additional analog multiplexer having an associated plurality of additional motion sensors, each with an additional anti-aliasing filter. The output of each analog multiplexer is connected to a corresponding scanner multiplexer. Each scanner multiplexer includes an output, a data input, and an address input connected to the address clock. The data input of each multiplexer is connected to the output of its associated analogue multiplexer. The scanner multiplexer includes means for passing the data from a selected subset of the addressed input channels of its associated analog multiplexer to its output when an address in the selected subset appears at the address input.

In the preferred design of this embodiment, each scanner multiplexer includes a second data input. The output of the first scanner multiplexer is connected to the input of the analog-to-digital converter, and the output of each successive scanner multiplexer is connected to the second data input of the previous scanner multiplexer. In this manner, a large number of sensors may be mounted on the structure, but only a subset of the sensors needs to be scanned so that they may be scanned rapidly as required for the response mode shape analysis.

In the preferred design, the apparatus also includes a modem which is remotely controlled and which sends the converted FFT data to a remote location for the response mode analysis.

The invention also comprises the method of monitoring a vibrating structure comprising mounting at least n motion sensors in spaced relations at points along a vibrating portion of the structure where the quantity n is greater than 1, filtering the raw data signals from the n motion sensors with n corresponding anti-aliasing filters to remove substantially all frequency components of the raw data signal above a selected cutoff frequency of interest, $f_{co}$, scanning the successive outputs of the anti-aliasing filters at a frequency of $f_{scan}$ where $f_{scan}$ meets the criteria:

$$f_{scan} \geq 2 \cdot n \cdot f_{co}$$

converting the scanned analog data to digital data and storing the digital data.

The method also includes calculating a first set of response mode shapes, determining a first signature for the structure based upon the calculated first response mode shapes, calculating a second set of response mode shapes, determining a second signature from the second set of mode shapes, and comparing the first signature to the second signature to determine whether significant structural changes have occurred in the monitored structure.

BRIEF DESCRIPTION OF THE DRAWINGS

For a fuller understanding of the invention, reference is had to the following description taken in connection with the accompanying drawings, in which.

DETAILED SUBSCRIPTION OF THE PREFERRED EMBODIMENT

Figure 1:
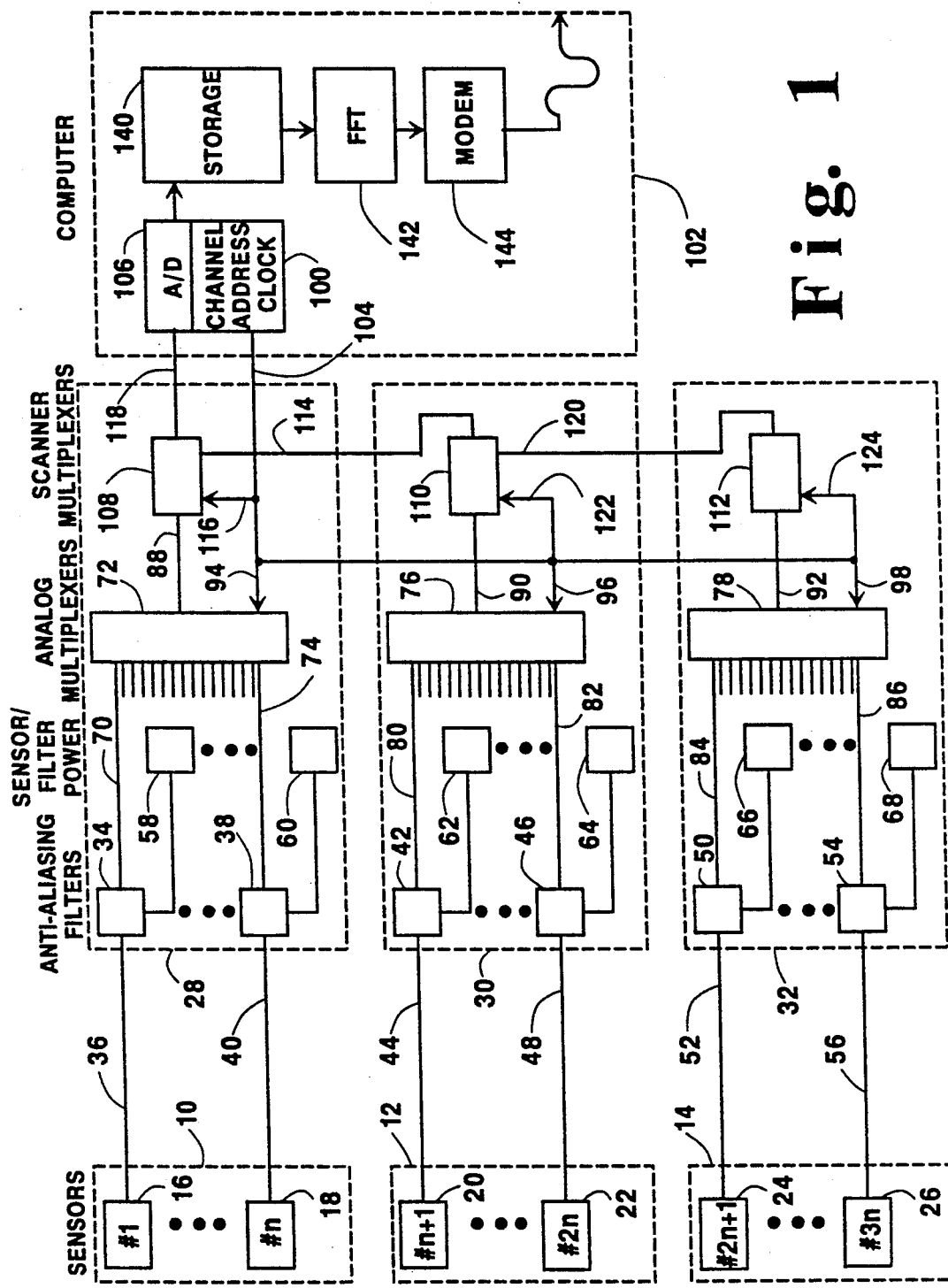
FIG. 1 is a block circuit diagram of the apparatus of the invention.

Referring to FIG. 1, the data collection apparatus of this invention comprises one or more groups of n sensors. First, second, and third groups of sensors are generally indicated with reference numerals 10, 12, and 14. The sensors in group 10 are numbered sequentially #1 through #n, with only the first sensor #1 (identified with reference numeral 16) and the last sensor #n (identified with reference numeral 18) being shown. The intervening sensors have not been shown in FIG. 1, but their presence is generally indicated by the three dots between sensor #1 and sensor #n.

The n sensors in group 12 are indicated in the same manner with the first sensor #n+1 in that group being indicated with reference numeral 20 and the last indicated sensor in that group, sensor #2n, being indicated with reference numeral 22.

Additional groups of n sensors may be used, if desired, such as sensor #2n+1 (indicated with reference numeral 24) to sensor #3n (indicated with reference numeral 26) in group 14. The sensors used are preferably linear accelerometers such as CBM-2000 accelerometers available from Vibra-Metrics, Inc. of Hamden, Conn., U.S.A. Such sensors have a suitable frequency range from 0.1 to 1,000 Hz. Displacement motion sensors, angular motion sensors and velocity sensors of other types may also be used.

In one practical embodiment of the present invention, the quantity n is 16 and two groups of sensors 10 and 12 are used providing a total of 32 possible sensors, only 16 of which are scanned at any given time.

The outputs of the n sensors in group 10 are connected via cables to n corresponding anti-aliasing filters located in a scanner 28. Scanners 30, 32 are provided for the sensors in groups 12 and 14, respectively.

The analog raw data signal generated by the first sensor 16 in group 10 (sensor #1) is fed to anti-aliasing filter 34 in scanner 28 over cable 36. Each of the sensors in group 10 has a corresponding anti-aliasing filter in scanner 28. The last sensor 18 (#n) in group 10 is connected to its corresponding anti-aliasing filter 38 via cable 40.

In a similar way, the sensors in groups 12 and 14 are connected to anti-aliasing filters in scanners 30 and 32. The first sensor 20 in group 12 is connected to anti-aliasing filter 42 via cable 44, the last sensor 22 in group 12 is connected to the last anti-aliasing filter 46 in scanner 30 via cable 48. Cables 52, 56 connect corresponding first and last sensors 24, 26 in group 14 to corresponding anti-aliasing filters 50, 54 in scanner 32.

The anti-aliasing filters are low pass filters with an extremely rapid cutoff at the maximum frequency of interest, $f_{co}$. In the preferred embodiment, these are commercially available seven-pole active filters having a cutoff frequency $f_{co}$ at 350 Hz.

Such precision filters require a source of power and thus it is more convenient to locate the anti-aliasing filter 34 inside the scanner 28 where power is readily available, instead of at the sensor location which would require an additional power connection cable.

As is well known to the art, each accelerometer sensor requires a constant current source power supply. The current supply power source for the sensor is combined with the power supply for the anti-aliasing filters into a sensor/filter power supply, one of which is provided for each sensor. Referring to FIG. 1, sensor/filter power supplies 58 and 60 supply the first and last sensors in group 10, respectively, and similar functions are performed by power supplies 62, 64, 66, and 68.

The raw data signal from the first sensor in group 10 passes from the output of that sensor along cable 36 to the input of the anti-aliasing filter 34 where frequencies above $f_{co}$ are removed. The filtered analog data signal passes from the output of filter 34 via line 70 to a corresponding input on analog multiplexer 72. The filtered analog signal from the last sensor in group 10 passes from the output of filter 38 via line 74 to another corresponding input on analog multiplexer 72.

Analog multiplexer 72 includes at least n inputs or channels corresponding to the n sensors in its group. Each channel is assigned a different address. The n channel inputs of analog multiplexer 72 are indicated generally on the left side of multiplexer 72. They are connected to the n sensors in group 10 (through the filters) via lines 70 and 72 and the other corresponding lines, omitted from the drawing to reduce complexity.

In the same manner, analog multiplexers 76 and 78 are located in scanners 30 and 32, and receive data from their corresponding sensors on lines 80, 82, 84, and 86.

Each analog multiplexer, 72, 76, and 78 has a multiplexed output connected to output lines 88, 90, 92, respectively, and an address input connected to an address bus via lines 94, 96, and 98. In the preferred design where n is 16, the address bus of lines 94, 96 and 98 is a 4 wire-4 bit bus which is capable of providing up to 16 different unique channel addresses on the bus from 0-15, i.e., 0000 binary to 1111 binary.

The analog multiplexers have 16 corresponding analog inputs. When the address of the first input connected to line 70 is applied to the address bus at line 94, the analog multiplexer 72 connects the signal on line 70 to the multiplexer output on line 88. When the address of the last channel input connected to line 74 is placed on the address bus at line 94, the analog multiplexer switches to the last channel input and applies the filtered analog data signal on line 74 to the output 88.

By scanning through a sequence of channel addresses at a high frequency, the filtered data signal from the multiple analog inputs is multiplexed onto the output 88. Each time the sequence of addresses is repeated, a new set of samples is taken from the sensors in the group. Provided that the address sequence is repeated sufficiently rapidly, the effect of the scanning will be to substantially simultaneously sample all the sensors in that group, at least for frequencies of interest up to a maximum set by the rate at which the address sequence is repeated.

This may be more clearly understood by a practical example from the preferred design where the quantity n equals 16 indicating that there are 16 sensors in each group and 16 corresponding addressed inputs to the multiplexer in each scanner. The maximum frequency of interest for vibrations on the monitored structure is 350 Hz, so the anti-aliasing filters have a cutoff frequency $f_{co}=350$ Hz.

The 16 inputs for each analog multiplexer are addressed 0-15, and the channel address clock 100 in computer 102 generates the sequence of addresses by incrementing a value from 0-15 and applying that value as a binary address to the address bus at its output connected to line 104.

Because the address bus 104 is connected directly to the address input lines 94, 96, 98, each of the analog multiplexers scans through the 16 addressed inputs. The complete sequence of addresses must be repeated rapidly enough to achieve the substantially simultaneous sampling desired, and this criteria will be met provided that the complete sequence of addresses is generated at a frequency which is twice the cutoff frequency, i.e., 700 Hz. To improve performance in the preferred embodiment, the complete sequence of addresses is generated at a frequency of 800 Hz and thus each sensor is sampled 800 times each second.

Because there are n=16 different inputs being sampled, successive outputs must be sampled by generating successive addresses at a frequency of at least $2.n.f_{co}$ referred to as the scanning frequency, $f_{scan}$. In the preferred embodiment where each channel is scanned more rapidly than this minimum, the scanning frequency for successive channels is 16.800 Hz=12.8 kHz which is greater than the minimum of $2.n.f_{co}$.

At the scanning frequency of 12.8 kHz, each filtered analog signal is sampled for 78 micro seconds. Because the filtering limits the rate at which the signal can change during this time period, the analog signal level remains substantially constant during this time period.

High speed analog multiplexers of the type required are sold by Metrabyte Corporation in Taunton, Mass., U.S.A., under Model No. EXP-20.

The multiplexed analog data is now converted from analog to digital form by the analog-to-digital converter 106 before final processing by computer 102.

In a system for monitoring a small structure, n sensors may be used where n represents the maximum number of points to be monitored. An analog multiplexer having n channel inputs may then be used to multiplex the data which is then fed directly to the computer 102 for processing.

However, as a practical matter, this design is difficult for use with many larger structures where the number of points n that one wishes to monitor is large. As the quantity n is increased, in order to maintain the substantially simultaneous sampling requirement, the frequency $f_{scan}$ must be increased proportionally to satisfy the requirement that $f_{scan} \geq 2 \cdot n \cdot f_{co}$ for any given desired cut-off frequency. For a large number of sensors, this may push the scanning frequency beyond the capabilities of cost-effective analog multiplexers.

A second problem is that analog multiplexers with a large number of inputs n may be difficult to find. Finally, for large structures, the cost of the cable connecting the sensors to the scanner module may be a substantial portion of the system cost. A single scanner means that all the sensors at distant points must be cabled to the single scanner. For such large structures it is often more economical to have several different scanner modules spaced along the bridge. This minimizes the cable run from the scanner module to each sensor, and allows the data from all the scanners connected to each scanner to be multiplexed onto a single cable.

For these reasons, the system has been designed to employ multiple scanners 28, 30, 32 which use scanner multiplexers 108, 110, and 112. More scanners may also be added to the system to accommodate even more sensors.

Each scanner multiplexer includes a data input connected to the corresponding multiplexer output, a second data input which may accept data from another scanner multiplexer, a data output for feeding data from the first or second data inputs to the computer or to another scanner multiplexer, and an address input connected to the address bus.

Referring to scanner multiplexer 108 in scanner 28, the first data input is connected to analog multiplexer 72 via line 88. The second data input is connected to the data output of scanner multiplexer 110 via line 114, and the address input is connected to the address bus via bus line 116. The data output of scanner multiplexer 108 is connected to the analog-to-digital converter 106 via line 118.

In a similar manner, the data output of scanner multiplexer 112 is connected to the second data input of scanner multiplexer 110 via line 120 and the address inputs of scanner multiplexers 110 and 112 are connected to the address bus via lines 122 and 124, respectively.

It should be understood that the computer 102 and the scanners 28, 30, and 32 are all connected to a source of power, typically 110 volt AC power to power the associated electronics. It should also be understood that the components indicated within the dashed boxes designating the computer 102, the scanners 28–32, and the sensor groups 10–14 are grouped for convenience only. In the preferred embodiment; all the components within the computer 102 are located within one housing and the components indicated within the three scanners 28, 30, and 32 are located within individual scanner housings. On the other hand, the components indicated in the sensor groups are widely scattered at separate sensor locations as explained below, but are preferably located in the general vicinity of a corresponding scanner module 28, 30, 32 to decrease cabling length.

In the preferred design, the address inputs of the analog multiplexer 72, 76, and 78 are commonly connected to the same address bus, and the addresses of the channel inputs to multiplexer 72 are the same as the addresses of the channel inputs to multiplexers 76 and 78. Thus, it will be seen that the output lines 88, 90, and 92 from the different analog multiplexers contain different multiplexed analog data signals corresponding to the n sensors in their respective groups 10, 12, 14.

The function of the scanner multiplexers 108, 110, and 112 is to select a subset of the n channels and to pass the data coming from that selected subset to its output and to block the data from the other sensors not in the selected subset.

By way of example, with analog multiplexers having 16 inputs, it may be desirable to monitor the data from the first 8 sensors in group 10 and the last 8 sensors in sensor group 12. Accordingly, scanner multiplexer 108 will be set to pass the data corresponding to samples from the first 8 sensors from line 88 to line 118, and to block the samples corresponding to data from the last 8 sensors in group 10. Scanner multiplexer 110 blocks the data from the first 8 sensors in group 12 and passes the data from the last 8 sensors in group 12, while scanner multiplexer 112 blocks the data from all its sensors.

The design of all the scanner multiplexers is identical, and accordingly only scanner multiplexer 108 is described below.

Figure 2:
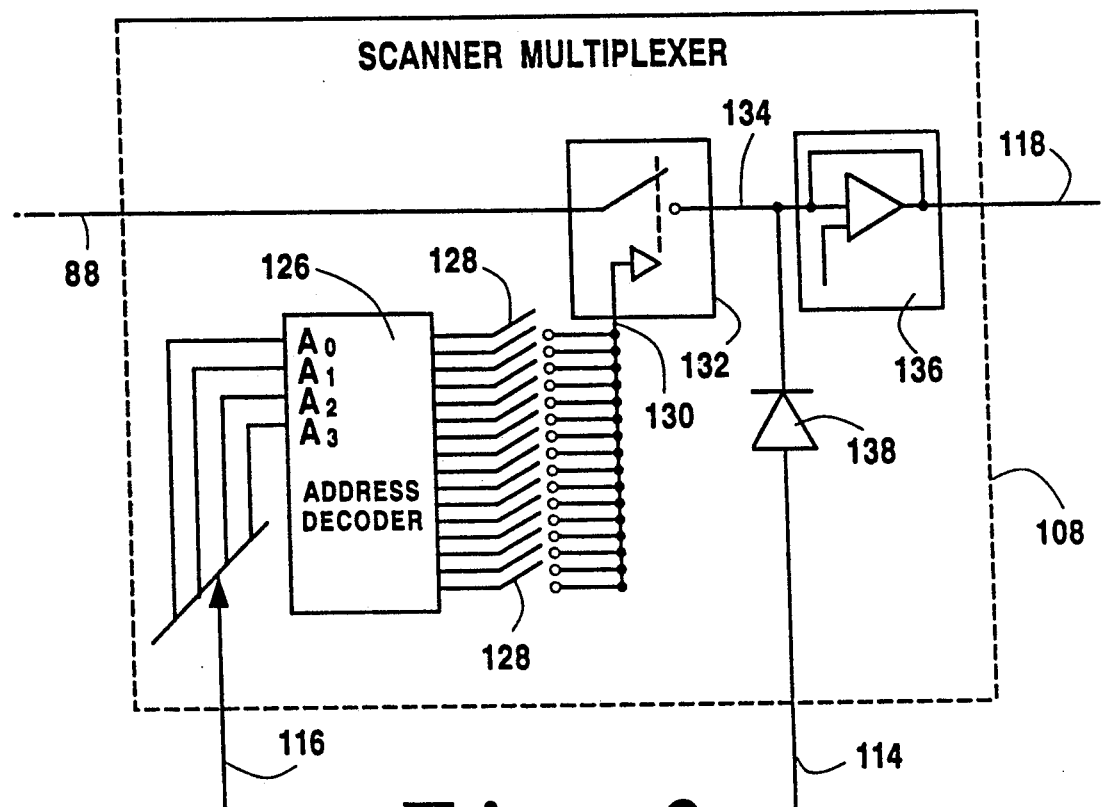
FIG. 2 is a block circuit diagram of a scanner multiplexer.

Referring to FIG. 2, scanner multiplexer 108 is shown connected to address bus 116, which actually comprises multiple address lines. Corresponding to the preferred design, the bus 116 is split into four address lines, as shown, which carry the binary encoded address into the address inputs $A_0$-$A_3$ on the left side of address decoder 126. The address decoder has n individual outputs on its right side which pass through n mechanical switches 128 corresponding to the n addresses.

The n decoder outputs correspond to the n sensors which may be addressed on the address bus. All of the address decoder outputs are kept at a binary low signal level except for the one output that corresponds to the address on the address bus. That output is switched to a binary high signal level.

The outputs from the n mechanical switches 128 are wired together and are connected to the control lead 130 of an electronic switch 132. If a switch 128 is closed when the address of that switch appears on the address bus, the high signal from the decoder output is passed to the control lead 130 which closes the electronic switch 132.

The input of electronic switch 132 is connected to the first input 88 of the scanner multiplexer. The output 134 of electronic switch 132 is connected to the input of a buffer amplifier 136 shown generically in block form. Those skilled in the art will have no trouble selecting a suitable electronic switch and buffer amplifier capable of operating at the necessary speeds determined by the cutoff frequency $f_{co}$ and the number of sensors n. A selected subset of addresses is defined for the scanner multiplexer by closing a selected subset of the switches 128.

The second data input 114 of scanner multiplexer 108 is also connected via isolating diode 138 to the input of buffer amplifier 136. Thus, every signal which appears on the second data input 114 passes through buffer amplifier 136 to the output 118. On the other hand, data present at the first data input 188 is only passed to the output 118 when electronic switch 132 is closed. This switch is closed when an appropriate address is present on data bus 116 and the corresponding decoded address switch 128 is closed.

In the example given above, the first 8 mechanical switches 128 in scanner multiplexer 108 would be closed and the bottom 8 switches 128 would be open. In scanner multiplexer 110, the top 8 mechanical switches 128 would be open and the bottom 8 switches would be closed. When the first eight addresses appear on the address bus, the electronic switch 132 in scanner multiplexer 108 would close passing the data from the first 8 sensors in group 10 onto the output line 118. When the last 8 addresses 8-15 appear on the address bus, the electronic switch 132 will be open and the corresponding electronic switch in scanner multiplexer 110 will close, and the multiplexed data from the last 8 sensors in group 12 will pass through line 114 through isolating diode 138 and out line 118 to the analog-to digital converter 106.

Analog-to digital converter 106 produces a single, digital number corresponding to the analog value of the 78 microsecond analog signal sample on line 118. This data is then stored in storage unit 140. In the preferred design, the addresses are repeatedly scanned for a sampling period and the n digital samples from each repetition of the sequence of addresses is stored in an array composed of n elements times the number of repetitions of the address sequence. In the preferred embodiment, n is 16, and the sampling period is 10 seconds which produces 8,000 samples for each of 16 channels or a total of 128,000 samples.

In the preferred design, the samples are converted in a 12 bit analog-to digital converter and are temporarily stored in random access memory (RAM) and subsequently written to a more permanent storage on disk.

Computer 102 may be any general purpose computer. A suitable machine is an IBM compatible computer employing an Intel 80286 or 80386 processor with a commercially available data acquisition card containing the analog-to-digital converter 106 and channel address clock 100 such as the DAS-20 made by Metrabyte Corporation of Taunton, Mass., U.S.A.

Once the simultaneously collected data has been stored, it may be processed by any desirable processing routine to determine the motion of the monitored points on the bridge, the frequency spectrum of the monitored points, etc.

A preferred processing method is to perform a fast Fourier transform (FFT) analysis upon the data collected from each sensor using FFT processor 142 which preferably comprises the computer 102 executing any of various well-known FFT conversion programs. This data may be further analyzed to generate the mode shapes. However, in the preferred embodiment, the processed data is fed to modem 144 and then out via a commercial phone network to a remote location where the final mode analysis processing is performed.

Modem 144 may also be used to initiate the sampling period remotely and for other control functions on the computer system.

Response Mode Shape Analysis

Figure 3:
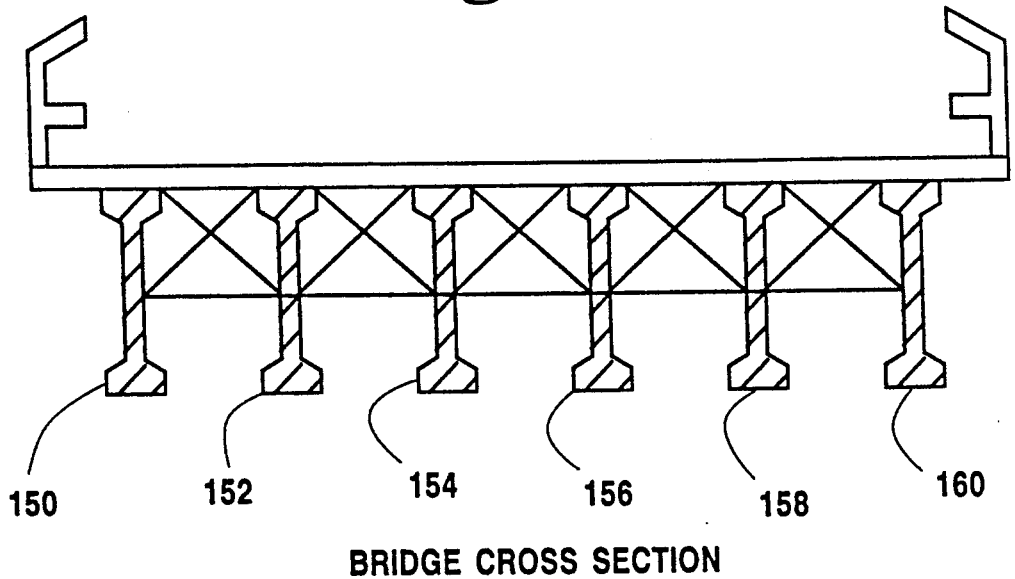
FIG. 3 is a cross section of a bridge to be monitored according to the invention taken in a plane perpendicular to traffic flow along the line 3—3 in FIG. 4.

FIG. 3 shows a cross section, perpendicular to traffic flow, of a simple bridge supported by 6 girders 50-160. Each of the 6 girders is anchored at its two ends and is free to vibrate everywhere else along its length. FIG. 3 is taken along the section lines 3—3 seen in FIG. 4 which shows a perspective view of the bridge in simplified form indicating the location of 32 sensors, #1 to #32.

Figure 7:
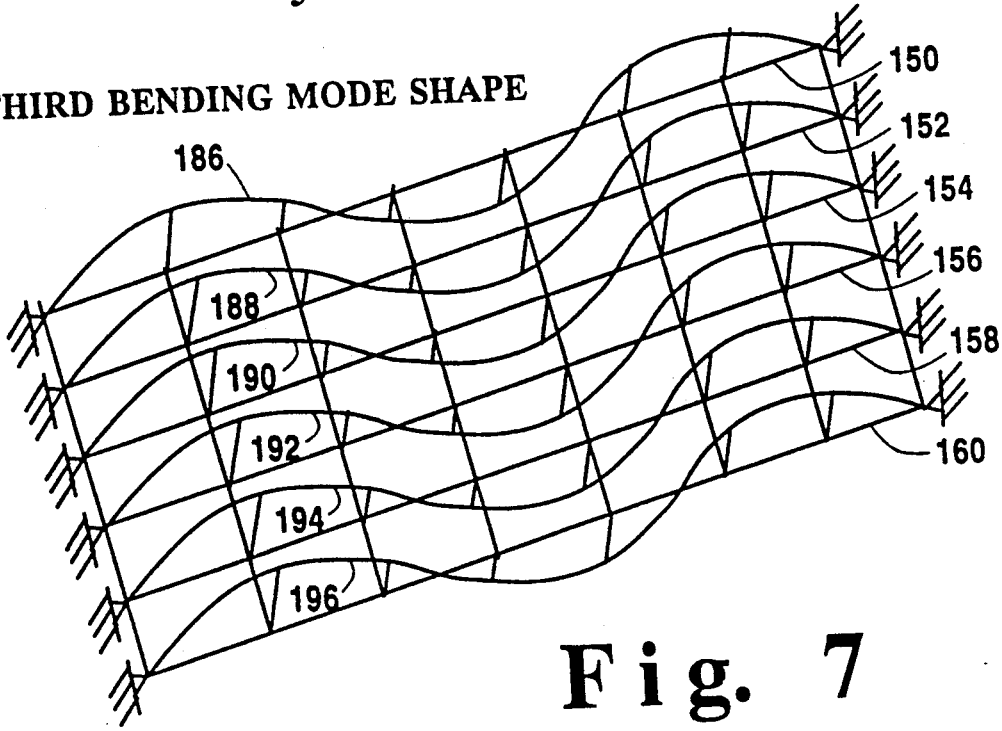
FIGS. 5, 6, and 7 show first, second, and third bending mode shapes for the bridge, respectively
Figure 5:
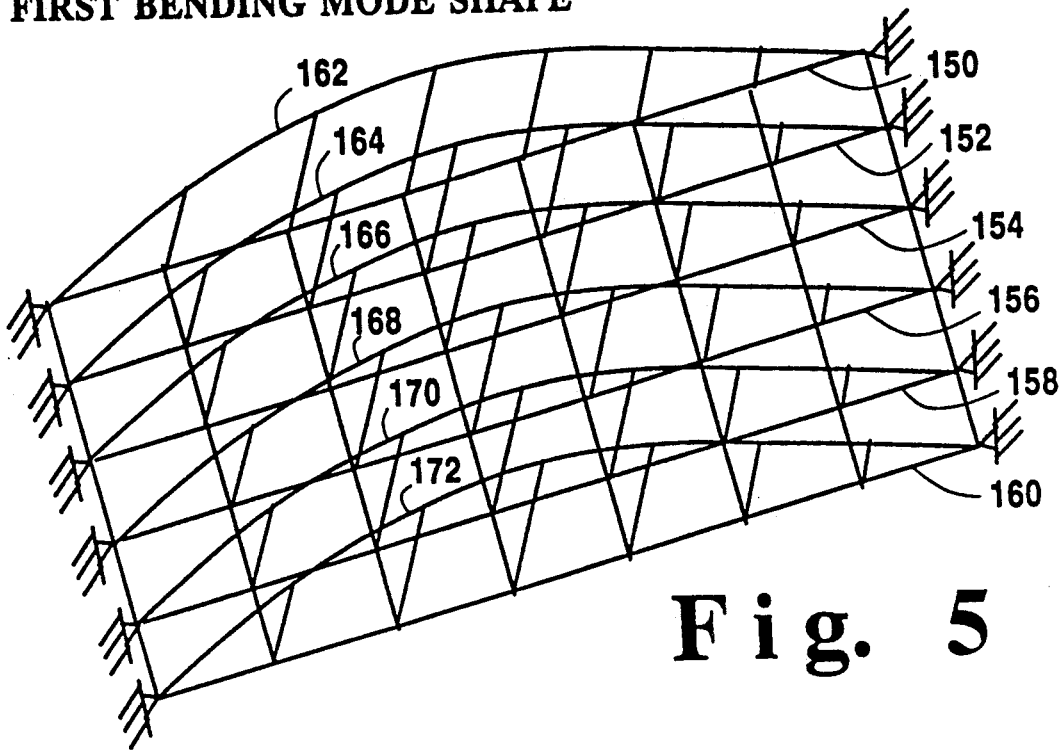
Figure 6:
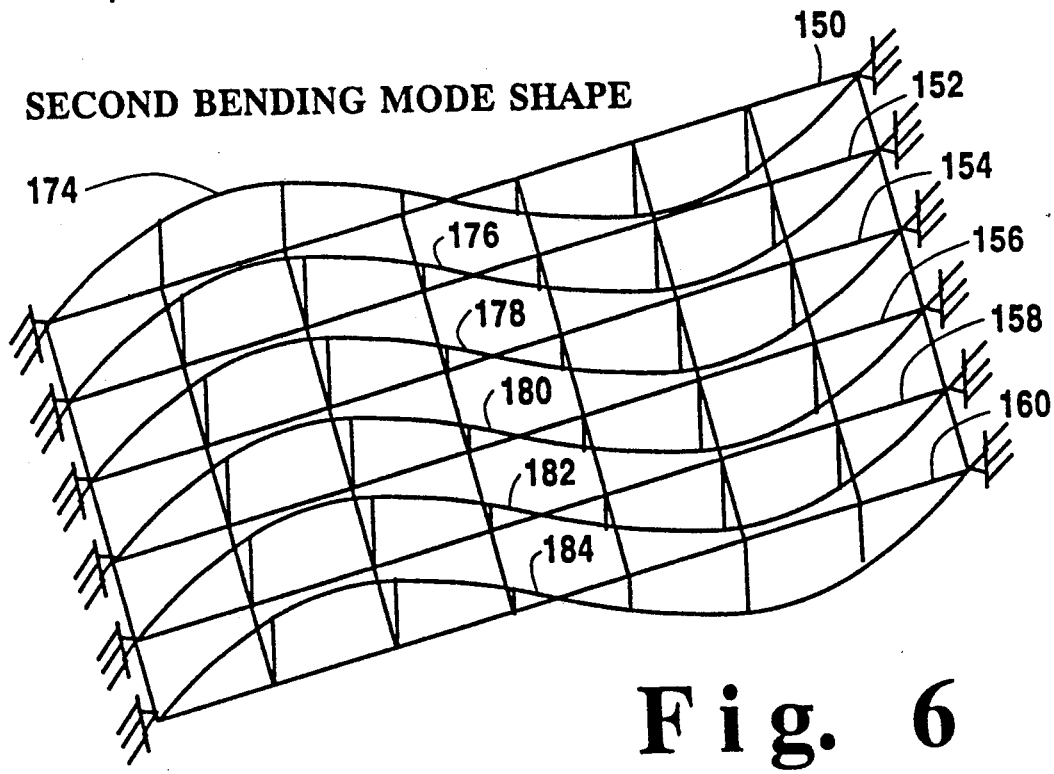

To simplify the explanation of the response mode shape analysis, it will be assumed that the bridge in FIG. 3 is infinitely stiff in the lateral direction, i.e., perpendicular to the flow of traffic and flexible only in the longitudinal direction parallel to the flow of traffic. With this assumption, the three lowest frequency mode shapes of the bridge of FIG. 3 are shown in FIGS. 5, 6, and 7. Each of these modes is a bending mode—torsional modes require lateral flexibility. In FIG. 5, the six girders are vibrating at their lowest fundamental frequency of vibration. It will be noted that the maximum amplitude occurs near the center point of each girder and the relative amplitudes are shown by the single-lobed half-sine wave arched curves 162-172 above the girders 150-160.

In the second bending mode shape shown in FIG. 6, the mode shape is a double-lobed full-sine wave shown by arched curves 174-184. It will be noted that the center of each girder beam which vibrated with the maximum amplitude in the first bending mode shape, has almost no amplitude of motion in the second bending mode shape.

In the third bending mode shape of FIG. 7, there are three lobes to the vibration mode on each of the curves 186-196.

In the first bending mode shape of FIG. 5, it will be seen that all points along each of the girders are moving up at the same time. In the second bending mode shape, it will be seen that the points on the left side of FIG. 6 are moving up while the points on the right side of FIG. 6 are moving down and that during each oscillation, points on the left and right sides of FIG. 6 move in opposition to one another. In the third bending mode shape, the center lobe moves up while the adjacent lobes move down. Without the information obtained by the substantially simultaneous sampling of the present invention, the relationship between the motion of the various points cannot be determined and the proper response mode shape cannot be calculated.

Figure 4:
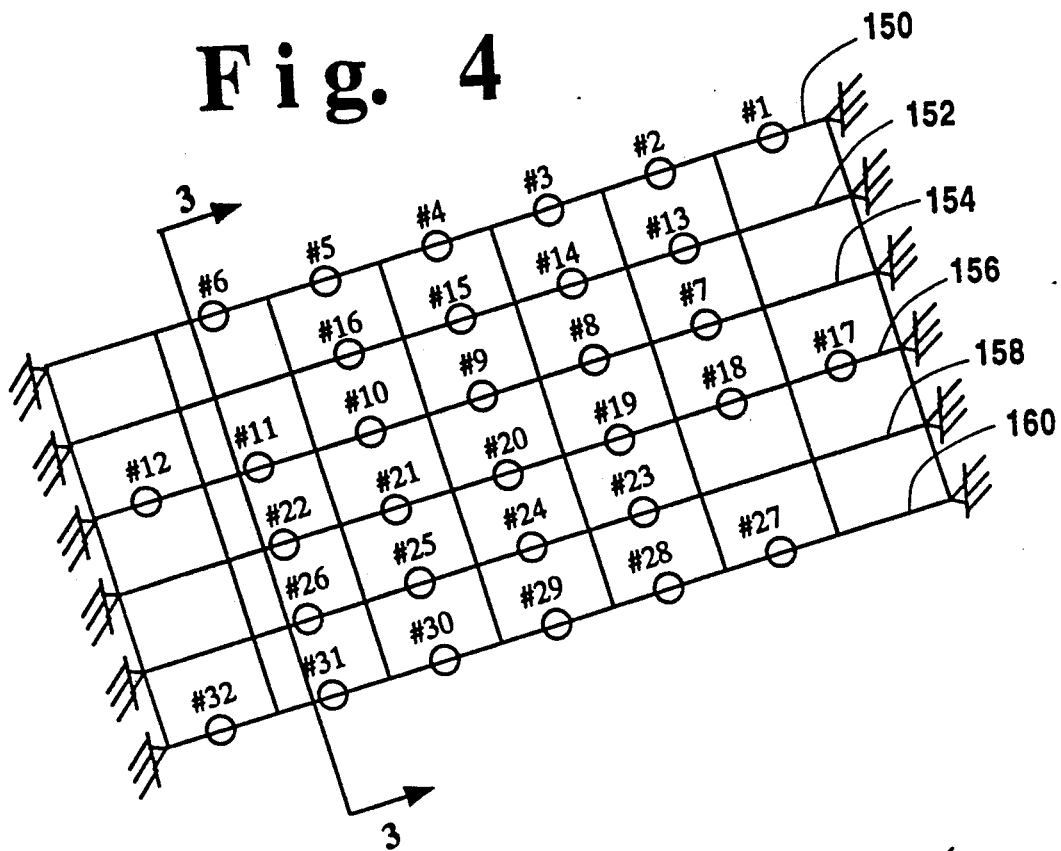
FIG. 4 shows a location plan for sensors #1 to #32 to be used in monitoring the bridge in FIG. 3.

FIG. 4 shows one possible layout for the sensors to monitor various mode shapes. Bending modes may be monitored by collecting data from any one or more of the following groups of sensors:

Group A—#1-#2-#3-#4-#5-#6
Group B—#7-#8-#9-#10-#11-#12
Group C—#17-#18-#19-#20-#21-#22
Group D—#27-#28-#29-#30-#31-#32

In a bridge that is infinitely stiff laterally, no torsional modes can result. However, in a real bridge or structure, torsional vibration modes will develop having characteristic vibration frequencies. Torsional mode monitoring can also be accomplished by analyzing the data from other groups of sensors, for example any one of the following groups:

Group E—#3-#14-#8-#19-#23-#28
Group F—#4-#15-#9-#20-#24-#29
Group G—#5-#16-#10-#21-#25-#30

Figure 8:
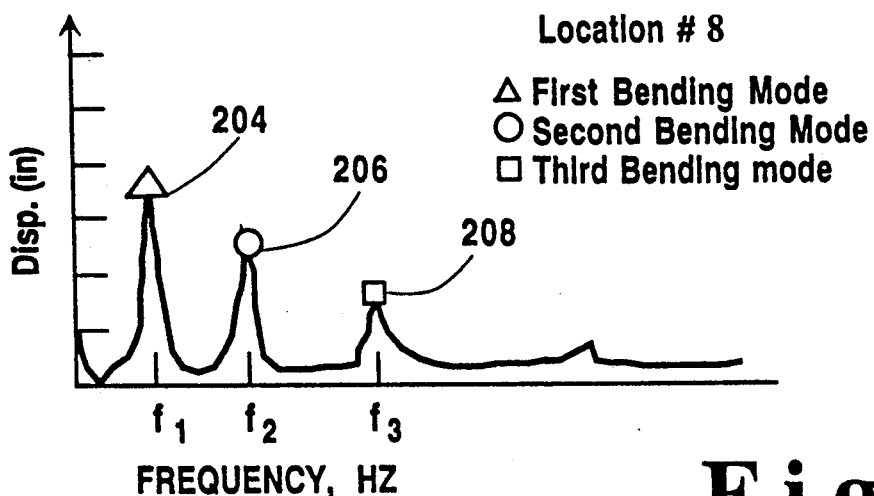
FIGS. 8, 9, and 10 show frequency response plots for sensors at locations #8, #9, and #10, respectively.
Figure 9:
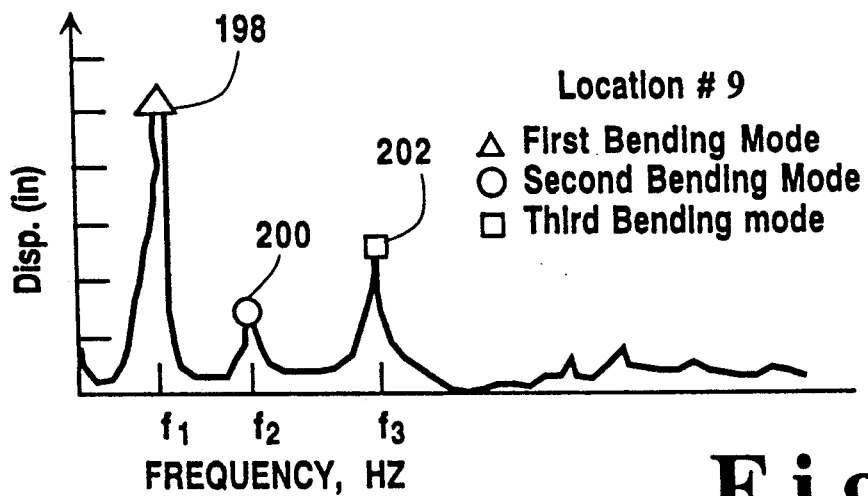
Figure 10:
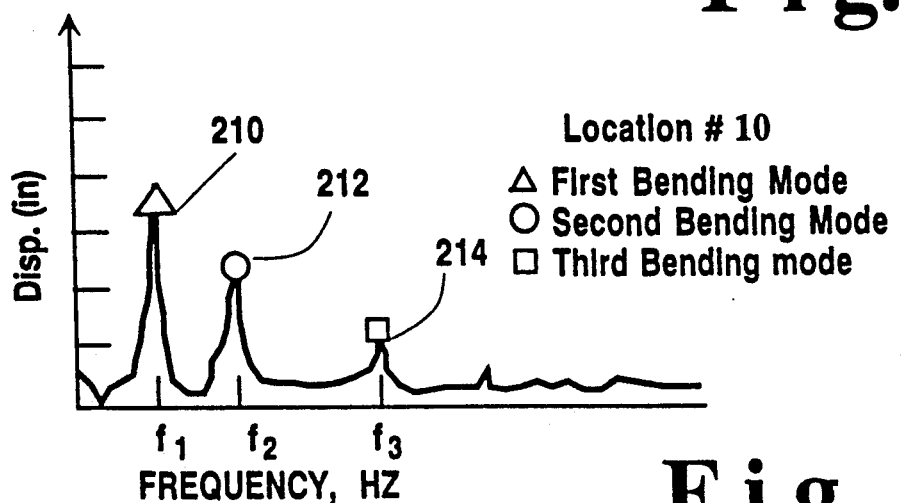

FIGS. 8, 9, and 10 show fast Fourier transform (FFT) plots of the frequency spectrum for the accelerometers located at sensor positions #8, #9, and #10, respectively.

Referring to FIG. 4, it will be noted that sensor location #9 is near the center of beam 154, while sensor positions #8 and #10 are located symmetrically about sensor position #9. Referring to FIG. 8, the FFT frequency plot shows three peaks at frequencies $f_1$, $f_2$, and $f_3$ corresponding to the natural frequencies of the first, second, and third bending modes.

Comparing the amplitudes of the peaks at $f_1$ in FIGS. 8, 9, and 10, given by the triangular data markers 198, 204 and 210, it can be seen that the maximum amplitude occurs in FIG. 9 at data point 198 corresponding to sensor location #9 at or near the center of the beam. The amplitudes of the $f_1$ peaks in FIGS. 8 and 10, data points 204 and 210 are comparable to one another but reduced from the peak amplitude of FIG. 9.

At frequency $f_2$, corresponding to the second bending mode, the frequency amplitudes in the FFT plots of FIGS. 8, 9 and 10 are given by the circular data points 200, 206 and 212. The amplitude for accelerometer location #9 at data point 200 is significantly below the amplitudes in FIGS. 8 and 10 at data points 206 and 212. This matches the shape of the bending mode seen in FIG. 6 in which the center of the beam vibrates very little. Indeed, if the sensor at location #9 is exactly in the center, frequency peak $f_2$ in FIG. 9 would disappear completely.

The square data points 202, 208 and 214 mark the maximum amplitudes of the peaks at frequency $f_3$ corresponding to the third bending mode.

FIGS. 8 and 10 show positive amplitudes for the frequencies in the second bending mode at data points 206 and 212. However, by referring to FIG. 6 it will be seen that sensor #8 is moving down while sensor #10 is moving up and vice versa. This information cannot be determined from the frequency portion of the FFT plot, but can be determined by further processing of the stored data, if desired. For example, the raw accelerometer data may be double integrated, or the phase information from the FFT analysis may be used.

For most structural monitoring, however, comparison of the frequency plots which gives the relative amplitudes is sufficient information given an understanding of the mode shapes possible in the bridge.

Additional FFT frequency plots are made for each of the monitored locations. Actual plots will often extend to frequencies beyond the first three modes, and will include peaks for torsional mode frequencies as well.

Figure 11:
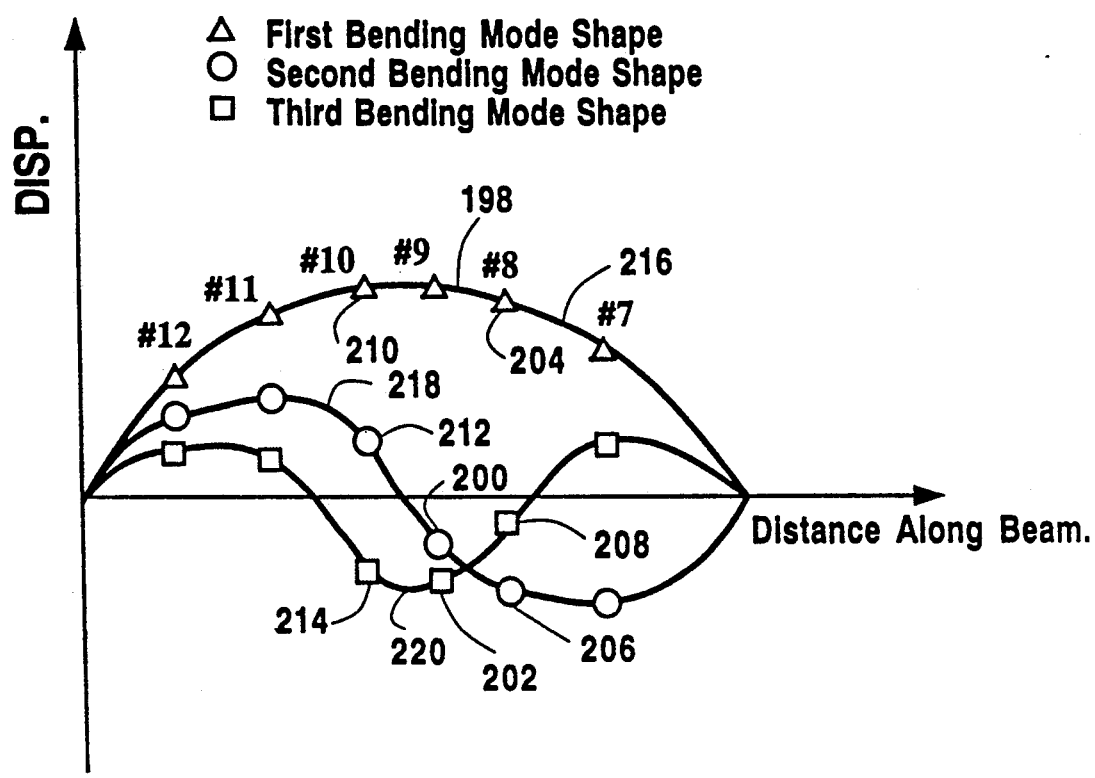
FIG. 11 shows calculated mode shapes for the first, second, and third bending modes.

FIG. 11 shows first, second, and third mode shapes generated from the FFT data in FIGS. 8, 9, and 10 and from FFT plots for other monitored sensor locations.

The amplitudes for the frequency peaks on the FFT plots are used to calculate the mode shapes in FIG. 11 for each of the three bending modes. These calculations may be made by the computer 102 detecting the peak amplitudes for frequency peaks as described below. The triangular data point amplitudes of the frequency peaks 198, 204, 210 for the first bending mode from FIGS. 8, 9, and 10 corresponding to sensors at locations #8, #9, and #10 are plotted along curve 216. The amplitude peaks from other FFT plots (not shown) for sensors at locations #7, #11, and #12 from FIG. 3 are also plotted in curve 216. They give a smooth single lobe vibration mode shape for girder 154 which closely corresponds to the theoretical shape of the mode in FIG. 5.

The circular data points for the second bending mode shape, including points 200, 206 and 212, are plotted along curve 218 showing two lobes as seen in FIG. 6.

The amplitudes along curve 220 produced from amplitude peaks 202, 208, and 214 show three lobes matching the expected theoretical bending mode shape of FIG. 7.

Only by ensuring that the data is sampled rapidly can the bending mode shapes of FIG. 11 be determined. If the data is collected too slowly, the data from the peak of one FFT plot may not be correlated with the data from another plot, and the mode shape will not be produced accurately.

The method of monitoring the vibrating structure comprises mounting the n motion sensors at spaced points along a vibrating portion of the structure. The raw data signals from the n motion sensors are filtered with n corresponding anti-aliasing filters to remove substantially all frequency components of the raw data signal above a selected cutoff frequency of interest, $f_{co}$. Successive outputs of the anti-aliasing filters are scanned at a frequency of $f_{scan}$ where $f_{scan}$ meets the criteria:

$$f_{scan} \geq 2 \cdot n \cdot f_{co}$$

The scanned analog data is then converted to digital data and stored.

To determine whether structural changes have occurred, a first set of response mode shapes is calculated and a first signature for the structure based upon the calculated first response mode shapes is determined. A second set of response mode shapes is calculated at a later time and a second signature from the second set of mode shape is determined and compared to the first signature to determine whether significant structural changes have occurred in the monitored structure. The comparison may take the form of point by point comparison looking for locations along one or more mode shapes in the second signature that differ by more than a predetermined percentage from the corresponding mode shapes in the first signature.

It will thus be seen that the objects set forth above, among those made apparent from the preceding description, are efficiently attained and, since certain changes may be made in carrying out the above method and in the construction set forth without departing from the spirit and scope of the invention, it is intended that all matter contained in the above description and shown in the accompanying drawings shall be interpreted as illustrative and not in a limiting sense.

What is claimed is:

1. Apparatus for monitoring a vibrating structure comprising:

a plurality of motion sensors adapted for mounting in spaced relation at corresponding points along the structure, each of the plurality of sensors producing an analog raw data signal indicative of motion at the corresponding point;

a plurality of anti-aliasing filters, each of the plurality of filters having an input and an output, the input of each filter being connected to a corresponding motion sensor, the raw data signal from each motion sensor being filtered by the corresponding anti-aliasing filter to produce a filtered analog data signal at the filter output by removing substantially all frequency components of the raw data signal above a selected cutoff frequency, $f_{co}$;

an analog multiplexer having a multiplexer output, an address input and a plurality of data input channels having addresses, each of the plurality of data input channels being connected to a corresponding output from an anti-aliasing filter, the filtered analog data signal from each of the plurality of data input channels being passed to the multiplexer output when the corresponding address of each data input channel is applied to the address input to produce an analog multiplexed data signal;

a channel address clock having an output connected to the address input of the analog multiplexer, the channel address clock being adapted to repeatedly generate a sequence of channel addresses to scan the data input channels at the multiplexer corresponding to the addresses in the sequence, the sequence of channel addresses being repeated at a frequency of at least twice the selected cutoff frequency, $f_{co}$;

an analog-to-digital converter having an input connected to the output of the analog multiplexer and an output, the converter producing a multiplexed digital data signal at the output of the analog-to-digital converter corresponding to the analog multiplexed data signal at the input of the analog-to-digital converter; and storage means connected to the analog-to-digital converter for storing digital data from the multiplexed digital data signal.

2. An apparatus for monitoring a vibrating structure according to claim 1 further including means for calculating response mode shapes for the structure from the digital data in the storage means.

3. An apparatus for monitoring a vibrating structure according to claim 1 further including a fast Fourier transform processor connected to the storage means for converting the digital data in the storage means to the frequency domain to generate frequency domain data.

4. An apparatus for monitoring a vibrating structure according to claim 3 further including a means connected to the fast Fourier transform processor for transmitting the frequency domain data to a remote location.

5. An apparatus for monitoring a vibrating structure according to claim 4 wherein the means for transmitting also includes a means for receiving instructions from the remote location to begin storing data for a sampling period.

6. An apparatus for monitoring a vibrating structure according to claim 1 further comprising:

at least one additional analog multiplexer having a plurality of data input channels and a multiplexer output;

a plurality of additional motion sensors associated with each additional analog multiplexer;

a plurality of additional anti-aliasing filters associated with the additional motion sensors, the anti-aliasing filters having inputs connected to the associated motion sensors and outputs connected to the data input channels of the associated analog multiplexer; and a plurality of scanner multiplexers corresponding to the analog multiplexers, each of the plurality of scanner multiplexers having an output, a data input and an address input connected to the address clock, the data input being connected to the multiplexer output of the corresponding analog multiplexer, each scanner multiplexer being adapted to pass data from a selected subset of the input channels of the corresponding analog multiplexer to the output of the scanner multiplexer when an address in the selected subset appears at the address input of the scanner multiplexer.

7. An apparatus for monitoring a vibrating structure according to claim 6 wherein each scanner multiplexer has a second data input, the first data input being connected to the multiplexer output of the corresponding analog multiplexer, the output of one scanner multiplexer being connected to the analog-to-digital converter and the output of each additional scanner multiplexer being connected to the second input of a preceding scanner multiplexer.

8. Apparatus for monitoring a vibrating bridge structure with traffic-induced vibrations comprising:

at least n motion sensors, where the quantity n is greater than one, adapted for mounting in spaced relation at corresponding points along a vibrating portion of the structure, each of the at least n motion sensors producing an analog output raw data signal indicative of motion of the structure at the corresponding point on the structure;

at least n anti-aliasing filters, each of the at least n anti-aliasing filters having an input and an output, the input of each filter being connected to a corresponding motion sensor, the raw data signal from each motion sensor being filtered by the corresponding anti-aliasing filter to produce a filtered analog data signal at the filter output by removing substantially all frequency components of the raw data signal above a selected cutoff frequency, $f_{co}$;

means for repeatedly scanning the outputs of the at least n anti-aliasing filters during a sampling period, the scanning means scanning successive outputs of the anti-aliasing filters at a scanning frequency, $f_{scan}$, where $f_{scan}$ meets the criteria:

$$f_{scan} \geq 2.n.f_{co};$$

means for generating a digital value corresponding to the filtered analog data signal present at the output of each filter when the output of each filter is scanned;

means for storing the digital value from each scanned output in an array;

means for calculating a first vibration mode shape from a first array corresponding to a first sampling period and a second mode shape from a second array corresponding to a second sampling period; and means for comparing the first and second mode shapes to determine whether the shapes have changed by more than a predetermined amount.

9. Method of monitoring a vibrating structure comprising:

mounting at least n motion sensors in spaced relation at corresponding points along a vibrating portion of the structure, where the quantity n is greater than one, each sensor producing an analog output raw data signal indicative of motion at the corresponding point on the structure;

filtering the analog output raw data signals from the n motion sensors with n corresponding anti-aliasing filters having n corresponding filter outputs by removing substantially all frequency components of the raw data signal above a selected cutoff frequency, $f_{co}$, to produce a filtered analog data signal for each sensor at the filter output of each corresponding filter;

scanning the filter outputs of the anti-aliasing filters such that successive filter outputs are scanned at a frequency of $f_{scan}$ where $f_{scan}$ is at least two times the quantity n times the selected cutoff frequency, $f_{co}$;
converting the scanned analog data signals to digital data with an analog-to-digital converter; and
storing the digital data.

10. The method of monitoring a vibrating structure according to claim 9 further comprising:

calculating a first set of response mode shapes;
determining a first signature for the structure based upon the calculated first response mode shapes;
calculating a second set of response mode shapes;
determining a second signature from the second set of mode shapes; and
comparing the first signature to the second signature to determine whether significant structural changes have occurred in the monitored structure.

* * * * *

UNITED STATES PATENT AND TRADEMARK OFFICE
CERTIFICATE OF CORRECTION

PATENT NO. : 5,255,565

DATED : October 26, 1993

INVENTOR(S) : Judd et al.

It is certified that error appears in the above-identified patent and that said Letters Patent is hereby corrected as shown below:

Column 4, line 19, "$2.n.f_\infty$" should be --$2 \cdot n \cdot f_\infty$-- indicating multiplication of the three factors in the equation.

Column 6, line 63, "$2.n.f_\infty$" should be --$2 \cdot n \cdot f_\infty$-- indicating multiplication of the three factors in the equation.

Column 6, line 68, "$2.n.f_\infty$" should be --$2 \cdot n \cdot f_\infty$-- indicating multiplication of the three factors in the equation.

Column 7, line 24, "$2.n.f_\infty$" should be --$2 \cdot n \cdot f_\infty$-- indicating multiplication of the three factors in the equation.

Column 10, line 9, "50" should be --150--.

Column 12, line 30, "$2.n.f_\infty$" should be --$2 \cdot n \cdot f_\infty$-- indicating multiplication of the three factors in the equation.

UNITED STATES PATENT AND TRADEMARK OFFICE
CERTIFICATE OF CORRECTION

PATENT NO. : 5,255,565
DATED : October 26, 1993
INVENTOR(S) : Judd et al

It is certified that error appears in the above-indentified patent and that said Letters Patent is hereby corrected as shown below:

Column 14, line 40, "$2.n.f_\infty$" should be $--2 \cdot n \cdot f_\infty--$ indicating multiplication of the three factors in the equation.

Signed and Sealed this

Nineteenth Day of April, 1994

Attest:

BRUCE LEHMAN

Attesting Officer        Commissioner of Patents and Trademarks